(12) United States Patent
Pines et al.

(10) Patent No.: US 7,346,157 B2
(45) Date of Patent: Mar. 18, 2008

(54) SYSTEM AND METHOD FOR EFFICIENT CALL MANAGEMENT FOR DIRECTORY ASSISTANCE SERVICES

(75) Inventors: Robert Pines, New York, NY (US); Christine Baumeister, Harleysville, PA (US); Franklin L. Weiland, II, Greensboro, NC (US)

(73) Assignee: Grape Technology Group, Inc., Bethlehem, PA (US)

( * ) Notice: Subject to any disclaimer, the term of this patent is extended or adjusted under 35 U.S.C. 154(b) by 748 days.

(21) Appl. No.: 10/688,769

(22) Filed: Oct. 16, 2003

(65) Prior Publication Data
US 2004/0156494 A1 Aug. 12, 2004

Related U.S. Application Data

(60) Provisional application No. 60/418,739, filed on Oct. 16, 2002.

(51) Int. Cl.
*H04M 3/493* (2006.01)
*H04M 7/00* (2006.01)

(52) U.S. Cl. .................. 379/218.01; 379/223

(58) Field of Classification Search ........... 379/218.02, 379/218.01, 223
See application file for complete search history.

(56) References Cited

U.S. PATENT DOCUMENTS

| | | | |
|---|---|---|---|
| 5,001,710 A | 3/1991 | Gawrys et al. ............. 370/271 |
| 5,442,693 A | 8/1995 | Hays et al. .................. 379/308 |
| 5,848,131 A * | 12/1998 | Shaffer et al. ............. 379/88.2 |
| 5,850,433 A | 12/1998 | Rondeau ..................... 379/201 |
| 5,940,483 A | 8/1999 | Shaffer et al. .............. 379/130 |
| 5,940,493 A * | 8/1999 | Desai et al. ................ 379/260 |
| 5,987,471 A | 11/1999 | Bodine et al. ............. 707/103 |
| 6,009,323 A | 12/1999 | Heffield et al. ............ 455/414 |
| 6,097,806 A | 8/2000 | Baker et al. ........... 379/265.12 |
| 6,108,646 A | 8/2000 | Mohri et al. ................... 707/1 |
| 6,320,943 B1 | 11/2001 | Borland ................. 379/112.01 |
| 6,404,884 B1 | 6/2002 | Marwell et al. ....... 379/265.13 |
| 2002/0083029 A1* | 6/2002 | Chun et al. .................... 706/45 |
| 2003/0007620 A1* | 1/2003 | Elsey et al. ............ 379/218.01 |

FOREIGN PATENT DOCUMENTS

| | | |
|---|---|---|
| WO | 0156262 | 1/2000 |
| WO | WO0072562 | 11/2000 |
| WO | 0223878 | 9/2001 |

OTHER PUBLICATIONS

European Search Report- Jul. 4, 2006.

* cited by examiner

*Primary Examiner*—Harry S. Hong
(74) *Attorney, Agent, or Firm*—Sofer & Haroun, LLP

(57) ABSTRACT

A communication assistance system is provided having a first database with a plurality of listings, each listing having at least one contact name and a corresponding contact number. A switching device receives calls from a plurality of users desiring to access the listings and an operator terminal receives the communication from the switching device and retrieves a listing from the first database. A first route is provided for handling telephone communications between the operator terminal and the user and a second route is provided with an out-of band processor for receiving information corresponding to call completion information and to provide call completion data to the switching device for completing the call between the user and the requested listing.

27 Claims, 11 Drawing Sheets

Special search screen - first requester service provider

FIGURE 2

Incoming Call Information Record 15

| Number Dialed by Requester | Preferred Language Code Field | Originating Phone Number of Requester | Requester Service Provider Field | Feature Code |
|---|---|---|---|---|

FIGURE 3

LISTING TABLE 52A

| Wireless Phone Number | |
|---|---|
| Name | Special Features Code |
| Directory Listed Name | WAIN Connect Field |
| Address: | Type of Data Field |
|    Street 1 | Data Source |
|    Street 2 | NPA/NXX Wireless |
|    City | Device Capability |
|    State | WAP |
|    Zip | SMS |
|    Zip + 4 | i-Mode |
|    Country | Other |
| Defined Locality | Special Announcement |
| Wireline Phone Number | General Announcement |
| Email Address | Special Services |
| Company | Pre-Announcement |
| Wireless Carrier | License Plate |
| Billing Info | Rate Plan |
| | geo code field |
| | |
| | |

FIGURE 4

CALL COMPLETION DATA PACKET 50

| | |
|---|---|
| 54 | Originating Phone Number of Requester Field |
| 56 | WAIN Information Field |
| 58 | Closing Prompt Code Field |
| 59 | Pre-Announcement Field |

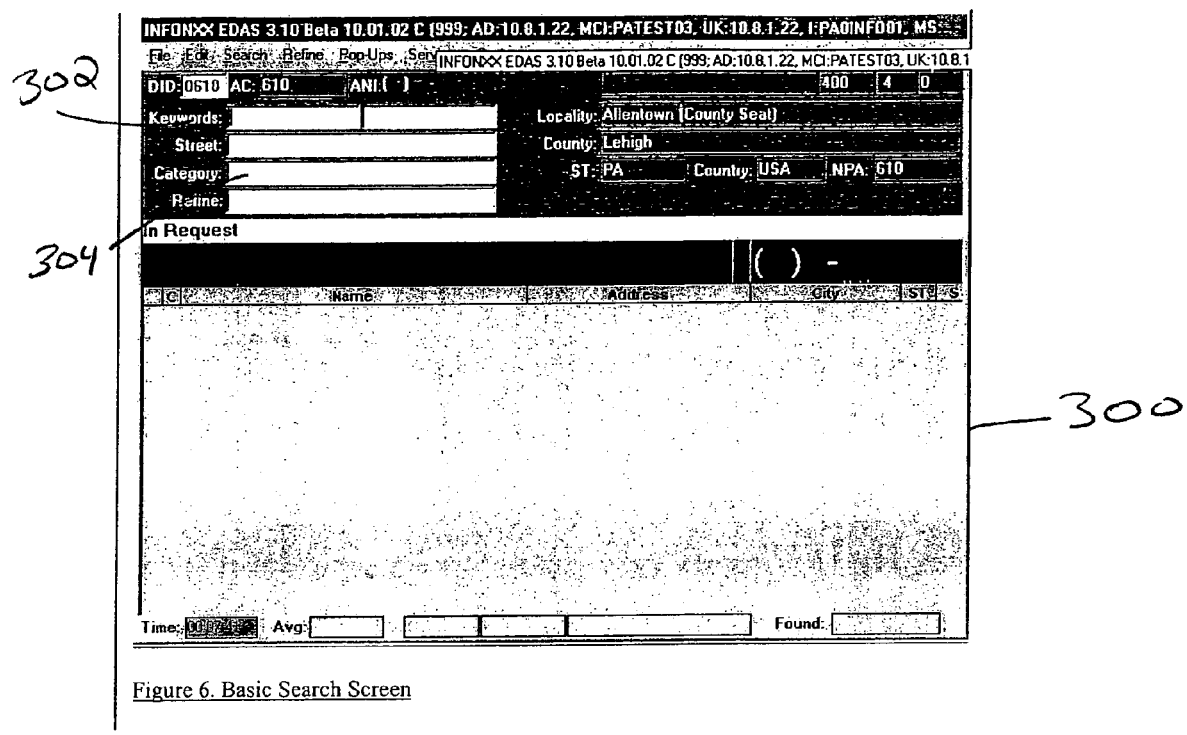
Figure 6. Basic Search Screen

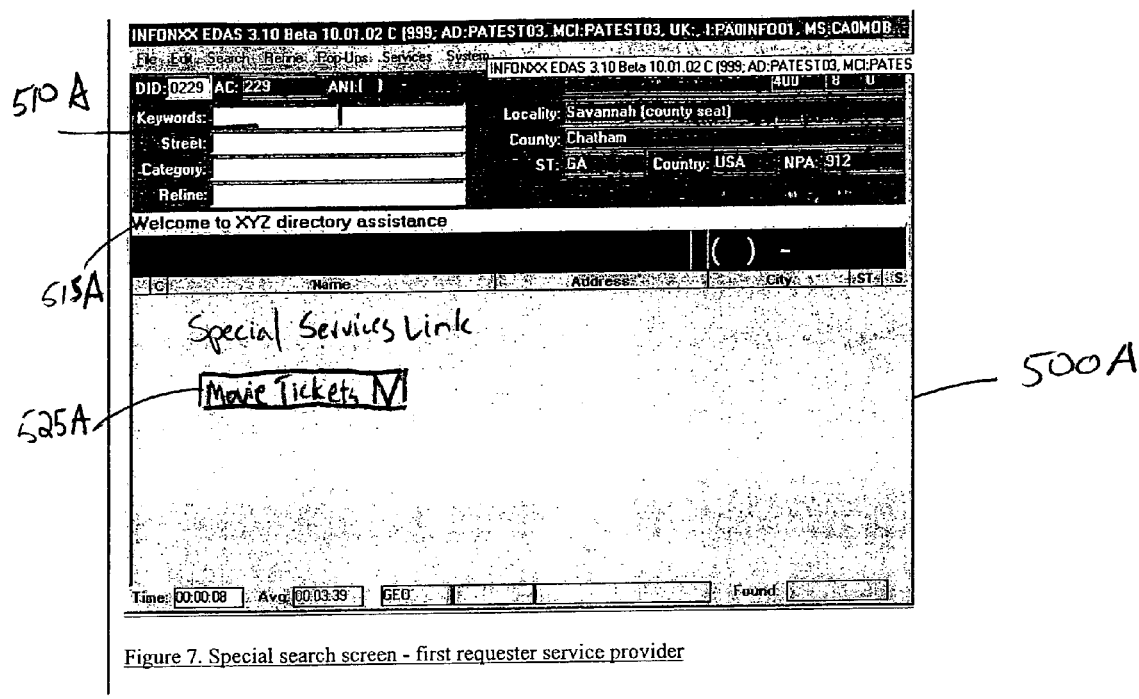
Figure 7. Special search screen - first requester service provider

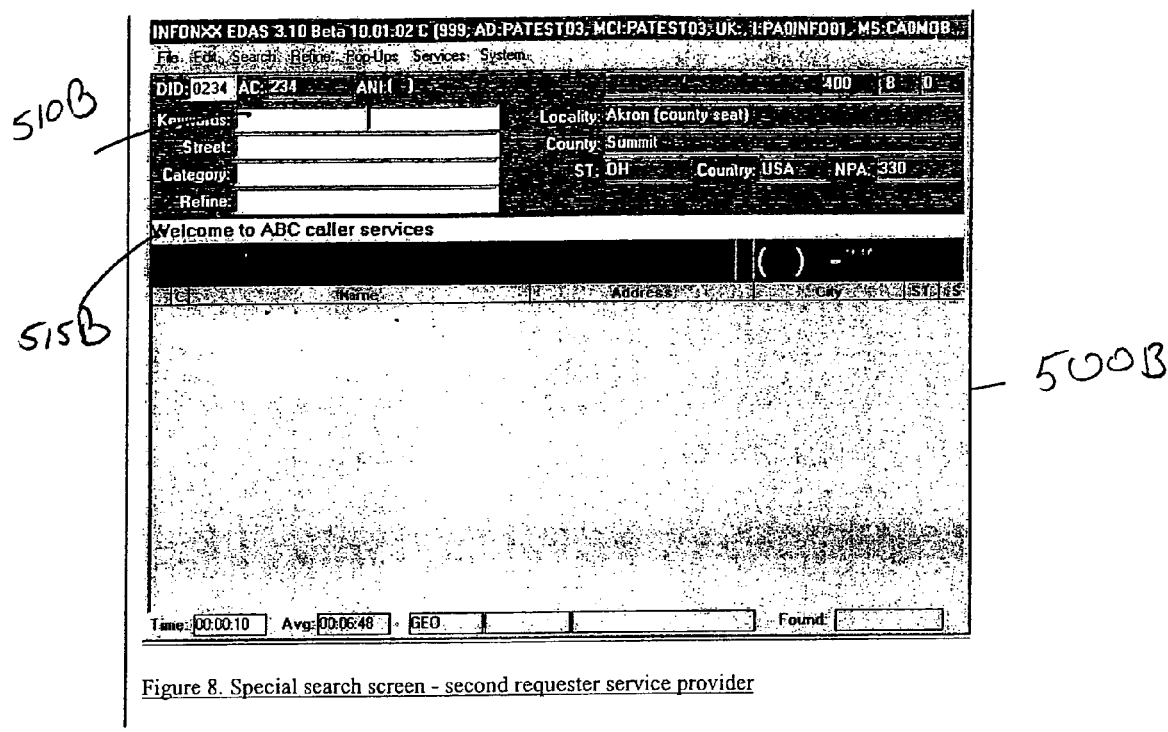
Figure 8. Special search screen - second requester service provider

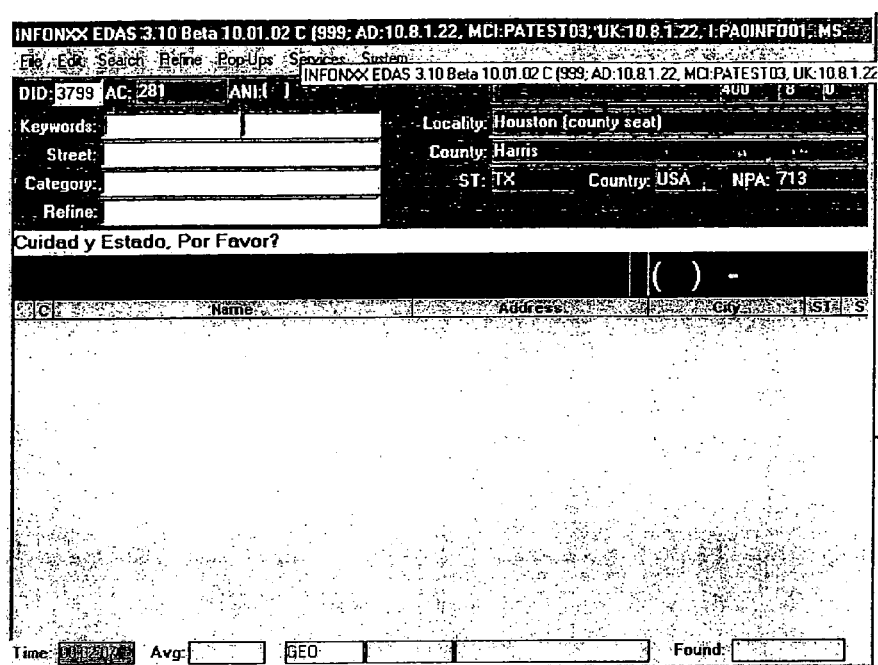
Figure 9. Spanish Language Requestor

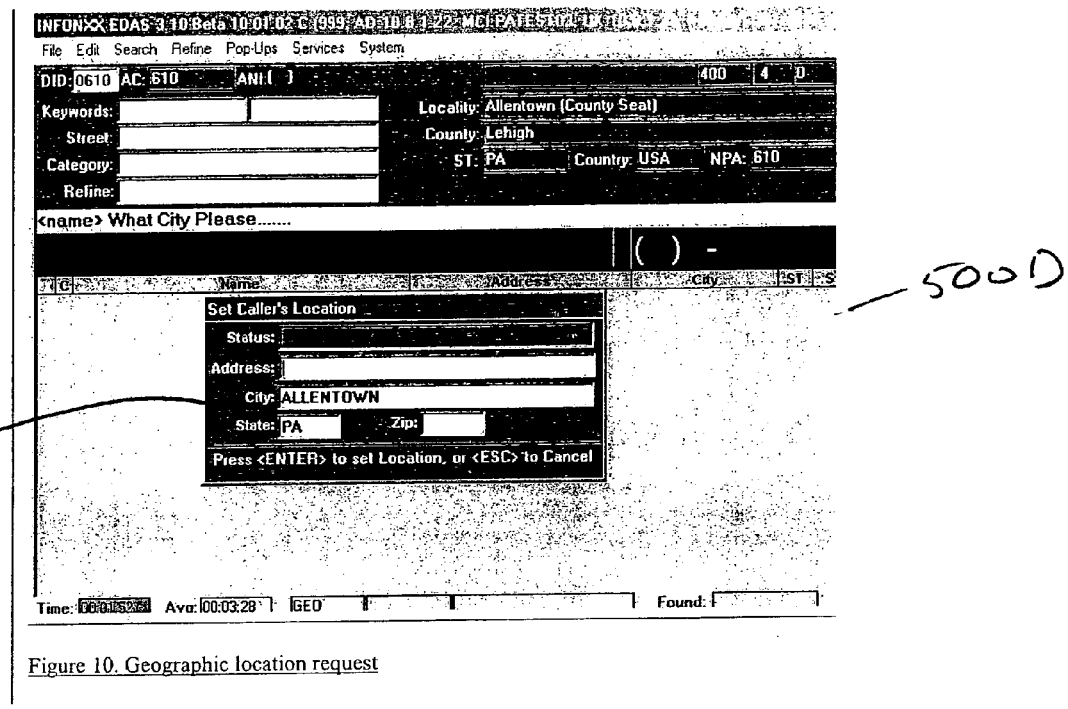
Figure 10. Geographic location request

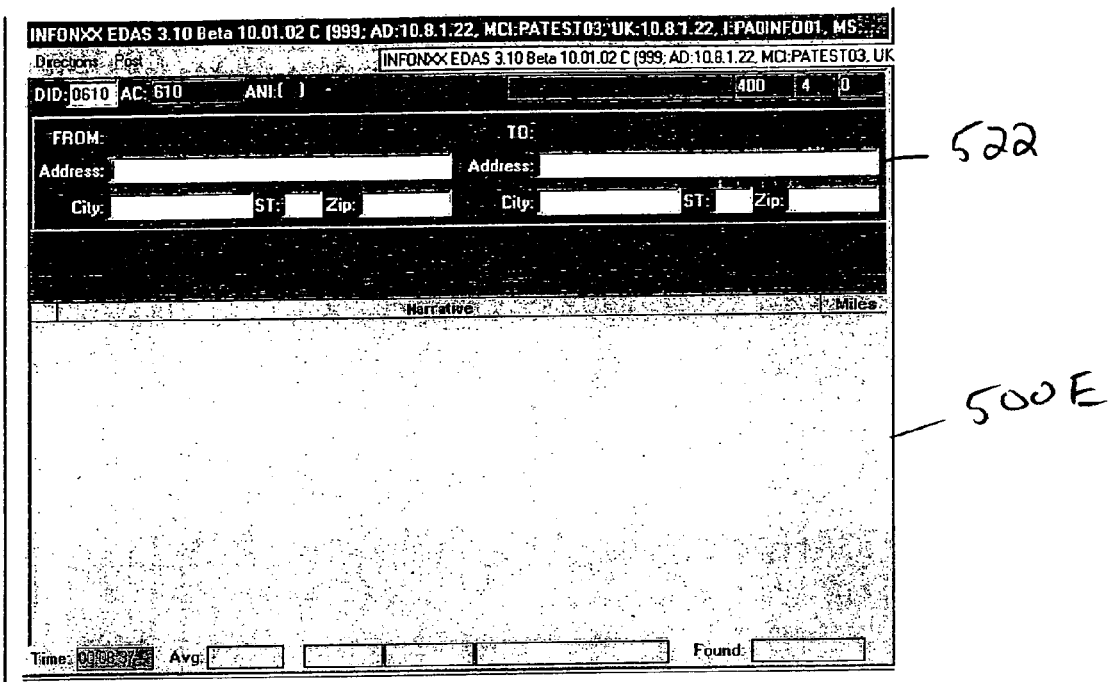
Figure 11. Directions Request

SYSTEM AND METHOD FOR EFFICIENT CALL MANAGEMENT FOR DIRECTORY ASSISTANCE SERVICES

RELATED APPLICATIONS

This application is related to and claims the benefit of priority to U.S. Provisional Patent Application No. 60/418,739, filed Oct. 16, 2002, the entirety of which is incorporated herein by reference.

BACKGROUND

1. Field of the Invention

The present invention is directed to a system and method, which allows a requester to contact a communication apparatus user, and in particular, to a system and method which provides directory and other information assistance services.

2. Description of the Related Art

Within the last decade the need for directory assistance services has dramatically increased. More and more people are carrying cellular phones, personal digital assistants, pagers, wireless messaging devices and so forth. It is almost impossible to keep a record of all the different contact information of a person that needs to be contacted. People often change their wireless carriers or lose their portable devices and replace them with new contact information. As such the directory assistance services are expanding their capacity to obtain, store and update all the necessary contact information to provide access to a calling party.

On the flip side, people who travel with their wireless devices often do not have access to traditional directory listings, such as yellow and white pages. Therefore, when they need to contact a person or a business, they also resort to directory assistance services.

With such proliferation of need for directory assistance services, the work load on customer service representatives or operators that search and retrieve the requested information is ever increasing. With increased load, the waiting time to service a caller's request increases. Sometimes, when a caller calls for information the phone rings many times before the next available operator begins to service the call.

Furthermore, because people are using directory assistance services while traveling from one place to another, often time they need information based on their geographic location, such, as for example, directions to a destination, or closest business establishment for their various needs.

Thus, there is a need to devise systems and methods that enhance the efficiency of directory assistance services to meet the growing demand for such services.

OBJECTS AND SUMMARY OF THE INVENTION

Thus, one objective of the present invention is to provide a convenient means to search though stored database listings based on geographic location.

Yet another object of the present invention is to enable system operators to search multiple criteria simultaneously so as to provide a requester with faster data retrieval with more accurate and desirable results to their queries.

Still another object of the present invention is to decrease the amount of operator input in order to properly search for the requested listing. The decreased need for inputting search criteria, which in many cases is repetitive from call to call, expedites the retrieval of information which leads to overall faster service per call.

Another object of the present invention is to provide a number of options for the delivery of the requested listing to the requester.

In combination, these and other objectives result in a more efficient call management system for directory assistance services.

Thus, in accordance with one embodiment of the invention, the directory assistance system is capable of meaningfully utilizing the geographic locations of the requested listings as well as cross referencing that information with other information stored in the listing to provide the most accurate information possible to the requester.

In accordance with another embodiment of the invention, the directory assistance system and method allows an interface mechanism that is arranged such that, based on the incoming caller DID and service provider or the numbered dialed by the caller, or the location of the caller (derived from either area code or from location determination equipment such as GPS), the system operator is prompted with particular data search screens which minimize repetitive data entry. Furthermore, the system is configured to deliver the desired data to the requester in a format selected by the caller without utilizing cumbersome technology, so as to reduce delays associated with data delivery.

In accordance with yet another embodiment of the invention, in addition to facilitating and expanding subscriber listing searches, the present invention allows for multiple options for distributing the desired information to the requester through out of band signaling so as to both increase information delivery options as well as reducing delays caused by using traditional means of information delivery To this end the present invention is directed to providing methods to enhance the speed at which accurate data is retrieved and delivered to the requesting party. By employing more efficient means for searching and delivering requested data, the system advantageously provides better customer satisfaction while simultaneously reducing unwanted overhead costs for system operation

BRIEF DESCRIPTION OF THE DRAWINGS

For the purpose of illustrating the invention, there are shown in the drawings several forms, which are presently preferred, it being understood, however, that the invention is not limited to the precise arrangements and instrumentalities shown.

FIG. 2 is a field diagram of an incoming call information record in accordance with one embodiment of the present invention;

FIG. 3 is diagrams of a first embodiment of tables used to create and organize the primary identification database in accordance with one embodiment of the present invention;

FIG. 4 is a field diagram of a call completion data packet in accordance with one embodiment of the present invention;

FIG. 6 is a search screen for the communication assistance system of FIG. 1, in accordance with one embodiment of the present invention;

FIG. 7 is a search screen for the communication assistance system of FIG. 1, in accordance with one embodiment of the present invention;

FIG. 8 is a search screen for the communication assistance system of FIG. 1, in accordance with one embodiment of the present invention;

FIG. 9 is a search screen for the communication assistance system of FIG. 1, in accordance with one embodiment of the present invention;

FIG. 10 is a search screen for the communication assistance system of FIG. 1, in accordance with one embodiment of the present invention; and FIG. 11 is a search screen for the communication assistance system of FIG. 1, in accordance with one embodiment of the present invention.

DETAILED DESCRIPTION OF EMBODIMENTS OF THE INVENTION

Figure 1:
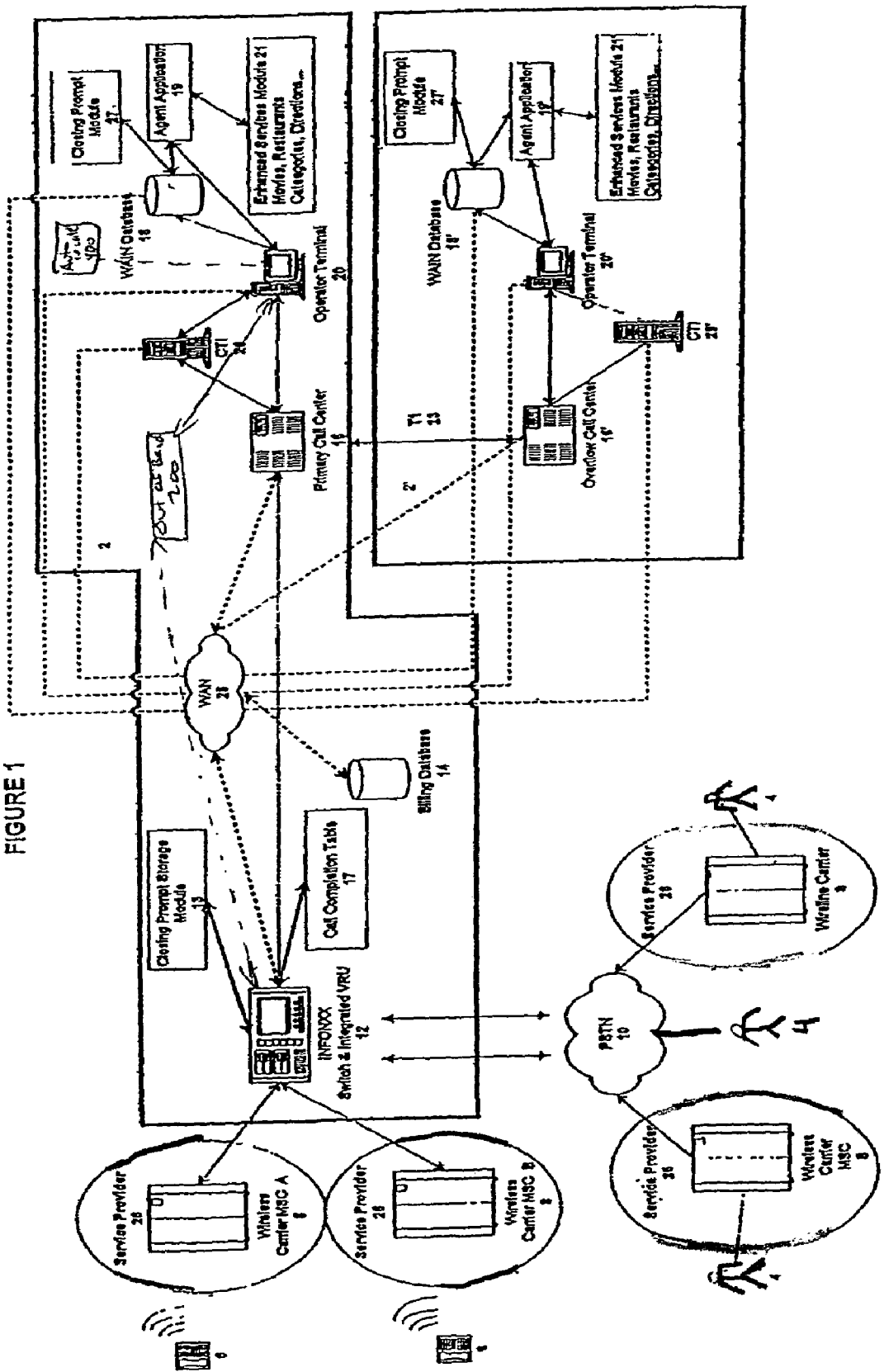
FIG. 1 is a diagram of a communication assistance system of the present invention in accordance with one embodiment of the present invention.

Referring now to the drawings, wherein like reference numerals refer to like elements, there is shown in FIG. 1, a communication assistance system 2 in accordance with one embodiment of the present invention. System 2 allows a requester 4 to initiate communications with subscriber 6, even where requester 4 does not know the identification number of subscriber 6. Subscriber 6 refers to either a wireless device used by a subscriber to a wireless service or a land device used by the subscriber to a land based service provider, and will be used throughout the application to refer to the subscriber that the requester 4 intends to reach. Requesters 4 can access system 2 via a traditional wireline Local Exchange Carrier (LEC) and/or Inter-Exchange Carrier, via a wireless carrier (including both voice and data access) or via connection to the Internet. Subscribers 6 can be any known wireless communication device including cellular telephones and modems, pagers, PCS phones and modems, RIM Blackberry, wireless PDA, instant messaging devices, SMS devices and the like as well as all traditional land based telephony devices.

Although the present invention is described in terms of a system and method that accommodate and search for listings of subscribers, the invention is not limited to such. It is contemplated that the present invention can be implemented to accommodate any subscriber 6 including those for which a published identification directory is desired, for example a Personal Digital Assistant (PDA) with voice communication capability, etc.

Communication assistance system 2 is preferably coupled to one or more service providers 26 directly through the wireless MSC (Mobile Switching Center) 8 or via public switched telephone network (PSTN) 10.

As shown in FIG. 1, system 2 is preferably comprised of one or more switches and integrated voice response units (VRU) 12 (the VRU may be standalone instead of integrated as described above), billing databases 14, primary call centers 16, subscriber identification number (WAIN) listing databases 18 and a plurality of operator terminals 20 running agent application 19 accessing enhanced service modules 21 that may be operated by an agent, closing prompt storage module 13, call completion table 17, a wide area network 25, closing prompt modules 27 coupled to agent applications 19, and a computer telephony interface 29. In particular, billing database 14 is connected to WAN 25 and can be coupled to any component of system 2. Switch units 12 are coupled to Mobile Switching Centers (MSCs) 8 and PSTN as well as primary call center 16. Primary call center 16 is also coupled to at least one operator terminal 20 and subscriber identification number (WAIN) listings database 18.

The connection between primary call center 16 and operator terminal 20 is such that voice communication is transmitted directly between the two and data information is transmitted via computer telephony Interface 29. Operator terminal 20 is not only connected to the subscriber identification number (WAIN) listing database 18 but also to other databases and software application modules as well.

It should be noted that system 2, illustrated in FIG. 1 is intended only as an example of one possible configuration so directory assistance system 1, however this is in no way intended to limit the scope of the present invention. Any similar system 2, which utilizes similar components to provide white page listings is within the contemplation of the present invention.

In operation, primary call center 16' receives forwarded calls from primary call center 16 in the case where system 2 is experiencing operational problems or a volume of requests that exceed its capacity. An important benefit provided by this arrangement is that the primary call center 16' of system 2' is able to act as an overflow unit for primary call center 16 of system 2 in the event that system 2 is experiencing technical difficulties or high call volume. This configuration allows primary call center 16 to route calls to primary call center 16' during periods of high volume, even in the event of a breakdown in the primary direct connections of system 2 as described above.

Another component of system 2 or 2' is call completion table 17. Call completion table 17 allows switch 12 to select an outbound trunk group that can most efficiently route the call to the end destination. For example, if requester 4 requests a traditional directory assistance listing (i.e. a wireline business or residential listing), service provider 26 of requester 4 may prefer to complete these calls on their own network. In this case call completion table 17 would select an outbound trunk group to service provider 26 of requester 4. In the case where requester 4 requests a subscriber identification number (WAIN) listing of a subscriber 6, it may be more desirable to complete the call via the network of the service provider 26 of the subscriber 6. In this case call completion table 17 would select a direct outbound trunk group to service provider 26 of subscriber 6.

Call completion table 17 also allows for the programming of multiple outbound routes for each call depending on, but not limited to, the time of day, the service provider 26 of the requester 4, the service provider 26 of subscriber 6, corresponding rates for each service provider 26 and the NPA/NXX of the destination.

WAIN listing database 18 and WAIN listings database 18' are similarly arranged, and are preferably mirror images of one another. Although operator terminal 20 is not shown directly coupled to primary call center 16' and WAIN listings database 18', operator terminals 20 can be so coupled via WAN 25, or can access call center 16' and database 18' via primary call center 16 as shown in FIG. 1. This overcomes situations where database 18 is down in system 2, such that operator terminal 20 completes the call using information stored on database 18'.

The links coupling the various components of system 2 together and with service providers 26 via Mobile Switching Center (MSC) 8 and Public Switched Telephone Network (PSTN) 10 can be any known voice and/or data communication technologies, including wide area networking and local area networking communication technologies, for example, digital subscriber lines (DSL), digital T-1s, leased lines, satellite or wireless links, Integrated Services Digital Network (ISDN) circuits, asynchronous transfer mode (ATM), Ethernet, token ring, fiber distributed-data interface (FDDI) and the like. It is also presumed that the various components of system 2, service providers 26 and PSTN 10 are arranged with appropriate communication hardware interfaces to transmit and receive data across the communication links. For example, wireless service providers 26 may interface directly with system 2 via Mobile Switching Center (MSC) 8 hardware coupled directly to switch 12 of system 2. Switches 12 can be any switches that preferably include an integrated voice response unit. Many functions performed by switches 12 are known to those of ordinary skill in the art and include telephone call routing between trunks, converting one signaling type to another, such as between a digital signaling system, dual-tone multi-frequency (DTMF) signaling, multi-frequency (MF) signaling, ISDN, SS7, etc., and capturing call length and destination data for billing, etc.

As shown in FIG. 1, when a call comes into switch 12, the call is identified by a DNIS which relates to the number dialed by the requester, so that appropriate data generated by system 2, such as call completion data packets 50 (FIG. 4), can be routed to the correct switch 12 to complete the call, as will be explained in more detail hereinafter.

Upon the initiation of a call completion, switch 12 is configured to pass the originating phone number of requester 4 and/or the number dialed by requester 4 to MSC 8 or PSTN 10 for delivery to subscriber 6. This enables subscriber 6 to screen in-bound calls.

As shown in FIG. 1, a closing prompt storage module 13 is configured to store a variety of closing prompt messages and data, such that when the switch 12 completes the call from requester 4 to subscriber 6, switch 12 can play any one of a variety of closing prompts based on the information received from a call completion data packet 50. The mode of delivery of the message can also be controlled by the customer representative as will be described in more detail below. Although only one switch 12 is illustrated in FIG. 1, any number of switches 12 can be used in system 2 to increase the capacity of system 2.

FIG. 2 illustrates an incoming call information record 15 provided by switch 12, after switch 12 receives a call from requester 4. Record 15 is sent to primary call center 16.

In accordance with one embodiment of the present invention, incoming call information record 15 contains a number of fields which may include but is not limited to: number dialed by requester field (DID; Direct Inward Dialing), preferred language code field, originating phone number of requester field and requester service provider field and feature code field.

The number dialed by requester field contains the number dialed by the requester and may be used to identify the originating switch location of the incoming call. The number dialed by requester 4 can be used by system 2 to provide operator terminal 20 with information so as to use particular search screen as will be discussed in more detail below.

The preferred language code field contains information indicating the language preference of requester 4. System 2, and in particular switch 12, maintains the ability to translate many different dial strings into system 2. One possibility for determining the preferred language of requester 4 is to automatically route calls from a particular dialed number, for example NPA-555-1818, directly to, for example, Spanish speaking operators. The preferred language code field is used to route calls to primary call center 16 via switch 12 by way of incoming call information record 15.

The originating phone number of the requester field holds the originating phone number of requester 4. The requester service provider field conveys the service provider of requester 4. This field allows system 2 to identify the calling party's service provider 26 for use with various functions such as introduction prompts, closing prompts, billing information, usage tracking, etc. One example of how this information is utilized by system 2, as described above, is to allow operator terminal 20 to use particular search screens based on the identity of the service provider, as will be discussed in more detail below.

The feature code field holds information that can be used to identify any special features associated with requester 4's device. These features could include, but are not limited to: promotional rate plans, standard rate plans, bundled service plans, device capabilities and the like. For example, service provider 26 may offer unlimited directory assistance for a flat fee per month, or could offer services free for a promotional period.

Although only five fields are identified for incoming call information record 15, any number of fields that are used to provide system 2 with the necessary data to complete a call is within the contemplation of this invention.

Call centers 16 and 16' are comprised of hardware and software which accept inbound calls from switches 12 and which distribute the calls to multiple operator terminals 20 using standard Automatic Call Distribution (ACD) technology. Operator terminal 20 interacts with database 18 to search for and retrieve a WAIN corresponding to subscriber 6. The search can be done using a single field or combination of fields, defined in table 52A as discussed below.

Call center 16 and 16' can be comprised of one or more processors coupled together in a networked arrangement to accomplish these functions, and can be constructed using known computing technology such as using personal computers, mini or mainframe computing devices, routers, switches and the like. Because the arrangement and operation of call centers 16 and 16' are similar, discussion of primary call center 16 is understood to also describe primary call center 16'.

Computer telephony interface (CTI) 29 is disposed between call center 16 and operator terminal 20. CTI 29 is configured to route the data portion of an incoming requester 4 call, such as the number dialed by the requester and the originating phone number of the requester to operator terminal 20, while the voice portion of the call is transmitted directly between call center 16 and operator terminal 20. While not discussed here, it is contemplated within the context of this invention that the data portion of an incoming requester 4 call could be sent to operator terminal 20 using in-band signaling (i.e., with the voice path of the call) as well.

Operator terminal 20 can also be any known computing device capable of receiving and displaying data on its display, including but not limited to a personal computer, UNIX workstation and the like. Although it is preferred that a separate customer service representative telephone be implemented as part of system 2 and coupled to primary call center 16 for communicating with requester 4, Operator terminal 20 is not limited to this arrangement. For example, operator terminal 20 can be arranged to contain an integrated telephone (as shown). In other words, any arrangement that allows a customer service representative to engage in oral communications with requester 4 is sufficient. In addition, although only a single operator terminal 20 is shown, system 2 is not limited to this arrangement. It is contemplated that system 2 is comprised of multiple operator terminals 20 such that more than one customer service representative is available to accommodate the users of system 2.

In one embodiment of the present invention VRU switch 12 allows requester 4 to communicate with system 2 by providing a series of voice activated responses and interactive menus. In this configuration, VRU switch 12 allows requester 4 to verbally communicate with system 2 alleviating the call volume burden on operator terminals 20.

It should be noted that primary call center 16 and its communication with switches 12, operator terminal 20 and database 18 as well as the arrangement and communication between primary call center 16' and switches 12' can be implemented in accordance with the connectivity and communication techniques described in U.S. Pat. No. 6,404,844, filed Nov. 24, 1999, issued on Jun. 11, 2002, the contents of which are incorporated herein by reference. In an alternate embodiment of this invention it is contemplated that a requester 4 may interact with an agent using a non-voice method such as, but not limited to: Short Messaging Service (SMS), Wireless Application Protocol (WAP), Live Chat, and Instant Messaging as will be discussed below.

Agent application 19 platform is used to operate operator terminals 20 and databases 18. System 2 not only supports the communications between these modules but also prepares a call completion data packet 50 that is to be sent to switch 12 to ultimately complete the call.

To create call completion data packet 50, operator terminal 20 and agent application 19 require information to be retrieved from database 18. This data is used to populate the various fields of call completion data packet 50.

An out of-band processor 200, as illustrated in FIG. 1 is configured to provide a direct out-of-band connection between operator terminal 20 and switch 12 so as to allow the operator on system 2 to send signals directly to switch 12 for completing the call to requester 4 without going through the traditional cumbersome and system slowing methods utilized in the prior art directory assistance systems.

In this configuration, out-of-band processor 200 is able to directly convey to switch 12 a variety of commands relating to the completion of calls with requester 4. For example, if requester 4 wishes to be connected to subscriber 6, switch 12 can end the call by connecting requester 4 to subscriber 6. Or, in the event subscriber 6 is unavailable, out-of-band processor 200 can directly inform operator terminal 20 to reconnect to requester through primary call center 16.

Alternatively, out-of-band processor 200 may convey the instructions of operator terminal 20 to switch 12 to end the call by delivering the number to subscriber 4 by either SMS, WAP, HTTP or any other means supported by requester 4. This is particularly advantageous in the case where requesters 4 are using wireless devices and may not have the ability to write the requested information down.

Out-of-band processor 200 is configured to relay the connection decision to switch 12 as made at operator terminal 20. The call closing decision is made by the customer service representative at operator terminal 20. The options may either be set to defaults. For example, requester 4, prior to making any calls associated with that originating phone number may set the default for information delivery to SMS, e-mail, HTTP or any other format supported by the wireless device used by requester 4. Other default options may include always completing directory assistance calls, completing the call and sending the number for storage in the device, or any other deliver options available through system 2.

Alternatively, if no defaults have been set by requester 4, upon retrieving the desired information requester 4 can select a delivery option to be entered at operator terminal 20 by the customer service representative. This allows a more efficient means of completing calls to requester 4, by eliminating the need for the customer service representative to dictate the number to requester 4 and it also eliminates the need for sending the DTMF connection tones to switch 12 "in band" so as to reduce the overall time for delivering requested information.

Database 18 is preferably any known database system which can be programmed to store all of but not limited to the following: wireline telephone directory listings, originating service provider 26 of requesters 4 listings, WAIN listings and other listings such as providers of goods and services. Database 18 preferably supports multiple database tables for a voluminous quantity of listings and multimedia data associated with each user or organization that is sponsoring a group of users.

It should be noted that the present invention augments the database tables described in U.S. Pat. No. 6,404,844, the entirety of which is incorporated herein by reference, by including several additional fields to support new features as discussed herein.

Database 18 can be based on any known database software and any known database format. The hardware configuration of database 18 can be any hardware platform capable of supporting the quantity of users and entries in their respective database tables. As such, database 18 can be stored on any device capable of storing the information.

Those of ordinary skill in the art can appreciate that although database 18 is shown as a single unit, it is not limited to this configuration. Database 18 can be comprised of multiple hardware units, i.e., central processing units and/or storage devices such as CD-ROMs, hard disk drives, tape disk drives, etc. which can communicate with each other across a transmission link. In addition, while only specific tables and fields within database 18 are discussed in detail, the current invention does not limit the table schema in database 18. In accordance with one embodiment of the present invention each database in system 2 or system 2' such as database 18 or 18' stores the same information. In an alternate embodiment, it is also contemplated that database 18 can take the form of a distributed database. For example, users who are primarily based on the west coast can be supported from a portion of database such as database 18' located in California, while users primarily located on the east coast can access a portion of database such as database 18 located in New York.

As illustrated in FIG. 3, listing table 52A stores information about each subscriber 6. This listing information includes, but is not limited to: the wireless phone number, subscriber 6 name, the directory listed name, address, defined locality, wireline phone number field, e-mail address field, company, wireless carrier, billing information, special features code, WAIN connect field, type of data field, data source field, NPA/NXX wireless field, device capability field, special announcement field, general announcement field, special services field, pre-announcement field, license plate field, geo-code field and other codes used in system 2 to populate various fields of call completion data packet 50.

The wireless phone number field of listing table 52A identifies the phone number of subscriber 6, for example a cell phone number. The name field represents the actual name of the subscriber for subscriber 6. The directory listed name field represents the chosen listing name for subscriber 6. For example, this field could hold the subscriber's real name, nickname or the chosen alias for the subscriber. The address fields of listing table 52A are contemplated to contain one or more addresses that contain one or more of the following fields: street address 1, street address 2, city, state, country, zip code and zip+4 address of the subscriber for subscriber 6.

The defined locality field identifies the subscriber's preferred locality or combination of localities. For example, a subscriber 6 residing in NYC, who frequently works in New Jersey may have a mobile phone which has been assigned with a Westchester area code. This subscriber 6 may elect to add both New York City and New Jersey or some other designation as a desired location in the defined locality field for being included in for directory assistance searches initiated by requesters 4.

Without such a feature subscriber 6, who is known to his co-workers and friends as a New York City resident cannot be located by a prior art directory system. In the above example, in the systems employed by the prior art, if a requester contacts the directory assistance service and asks for "subscriber 6" located in "New York City" or "New Jersey" the system will be unable to retrieve that reference because that particular subscriber's wireless number is based in Westchester and thus will not appear in the search results for a New York City resident.

However, with the defined locality field in listing table 52 A of the present invention, a requester 4 who contacts the directory assistance service and asks for "subscriber 6" located in "New York City" the system will be able to retrieve the wireless listing for subscriber 6 even though the area code is a Westchester area code. In performing searches of database 18, system 2 will look not only for area code matches to the requested location but it also searches through the defined locality fields for matches. Thus, for a subscriber 6, with a Westchester area code, that has entered both New York City and New Jersey in their defined locality field, their listing will appear on searches directed to "subscriber 6" in "New York City", "New Jersey" and "Westchester."

The wireline phone number field identifies one or more wireline phone numbers of subscriber 6. The e-mail field identifies one or more e-mail addresses of subscriber 6.

The company field of listing table 52A identifies the company for which the subscriber of subscriber 6 works. The wireless carrier field of listing table 52A identifies the service provider 26 for subscriber 6. This information can be used in conjunction with the closing prompt feature as well as billing and other related features.

The billing information field of listing table 52A contains information specific to subscriber 6 which will support the billing function. This field provides system 2 with the specific billing instructions for subscriber 6 including the service provider information as well as special service subscriptions. For example, the subscriber of subscriber 6 may elect to incur charges on incoming calls. In this case, the billing information field would indicate that subscriber 6 is not responsible for the cost of the inbound call from requester 4.

The special features code field of listing table 52A identifies any particular special features that may be associated with the subscriber's 6 account. This includes information such as group connect features, where a large employer distributes a number of phones company-wide. In such instances, a single billing party may have several or even hundreds of wireless accounts listed under one name, such that the actual individuals who use the wireless devices do not appear on the listing. Information in this field can be used for category searches, such as all employees at company XYZ; special billing codes; or possibly for use in closing prompt selection, if one is not already specified by subscriber 6.

The subscriber identification number (WAIN) connect field of listing table 52A identifies the degree of availability of the listing for disclosure. The type of data field of listing table 52A identifies the type of wireless device that is being listed in the subscriber identification number (WAIN) listings table.

The data source field of listing table 52A identifies the data source from which the subscriber 6 listing originated. This field provides information to system 2 identifying the source of this listing such as a service provider or any other entity, for example a third party or the subscriber of subscriber 6 that supplied the data contained in database 18, and can be used in conjunction with such features as the closing prompt or with bonuses or incentives.

The NPA/NXX wireless field of listing table 52A identifies whether or not requester 4 is using a wireless device or landline device. This field is used to turn on and off certain features, which may only be available to either wireless or land based phones.

The device capability field of listing table 52A identifies the capabilities of subscriber 6 device. It is contemplated that these capabilities may include: SMS, WAP, iMode, etc., capabilities.

The special announcement field of listing table 52A and/or database 18 identifies if there are any particular special closing prompts paid for or requested by either subscriber 6 or a preferred provider to be used by closing prompt module 27.

The special announcement field of listing table 52A and/or database 18 is also used to cross-reference other services provided by system 2. It is contemplated in the current invention that system 2 shall be enabled to provide traditional directory assistance as well as enhanced traditional directory assistance which includes but is not limited to additional services such as: restaurant recommendations and reservations; movie times and ticket purchase; category searches; alternate language services, directions services, and preferred provider opportunities.

The special announcement field is intended to enable the cross referencing of announcements and/or closing prompts to direct requester 4 to other services offered by system 2. These messages can be tailored as well to provide precise information on the availability and extent to which those services are offered. It should be noted that cross-referencing codes found in the special announcement field can be used alone or in combination with designed closing prompts.

The general announcement field of listing table 52A and/or database 18 identifies if there are any general closing prompts attached to subscriber 6's listing to be used by closing prompt module 27. This field is similar to the special announcement field; however, the closing prompts called for here are not specifically tailored to the subscriber 6.

Similar to the special announcement field, the general announcement field also allows for the use of multiple codes and also allows cross-referencing of other system 2 services. For example, if the same preferred provider restaurant offered reservations, it may wish to include a cross referencing closing prompt in their general announcement field. Unlike the special announcement field, the cross referencing prompt would not be specifically tailored to the restaurant but instead would be of more generic variety.

The special services field of listing table 52A and/or database 18 identifies any special services that a third party may provide. This field is used when performing category searches when a requester 4 wishes to direct their search for certain abilities or conditions, such as: open 24 hours, Spanish speaking, hearing impaired compatible etc. For example, if a requester 4 asks for all Spanish-speaking restaurants in the area, when operator terminal 20 searches database 18, the only listings that will be retrieved will have a Spanish speaking code in the special service field.

The pre-announcement field of listing table 52A identifies if the subscriber of subscriber 6 wishes to have any incoming calls pre-announced. This field determines whether there is preference for voice or text or multimedia pre-announcements assuming the service provider for subscriber 6 supports the appropriate formats. If both formats are not supported the pre-announcement field will default to whatever is supported by the service provider. If a preference for a voice pre-announcement is indicated or if the service provider can only support a voice pre-announcement, it is contemplated by this invention that this field will include but not be limited to the following four options: connect call with pre-announcement, connect call without pre-announcement, connect call only to subscriber 6's voicemail, and connect call to a system 2 temporary voicemail device (VRU). In the event that the subscriber of subscriber 6 chooses message delivery only, it is contemplated by this invention that the temporary voicemail device (VRU) will prompt requester 4 to record and store a message, and will then attempt to deliver the message to subscriber 6 via voice and/or data delivery.

Once requester 4 indicates that he/she has accepted the message recorded, the call will be disconnected. If a preference for a data and/or text pre-announcement is indicated or if the service provider can only support a data and/or text pre-announcement, it is contemplated by this invention that this field will include but not be limited to the following one option: connect call with data and/or text pre-announcement. It is contemplated by this invention that this option shall specifically include the conversion of a recorded voice message to text and the delivery of that message via any of but not limited to the following formats: SMS, WAP, iMode, instant messaging, etc.

The license plate field of listing table 52A contains the License plate of the primary vehicle associated with the subscriber of subscriber 6. This information can be used to associate a subscriber with one or more vehicles in which they may be traveling.

The rate plan field of listing table 52A contains the rate plan of subscriber 6. This information is used to determine things such as if roaming charges will apply, if long distance charges will apply and the number of monthly minutes associated with the plan.

Finally, the geo code field of listing table 52A stores information related to the geographic location of subscribers 6 and requesters 4. A geo-code field is also provided in a temporary file 52B that is set up while requester 4 is being handled. The geographic location of a subscriber 6 may be based on the area code of the subscriber in the case of land lines or may be based on other information in the case of wireless connections. In the case of requester 4 contacting system 2, where requester 4 is seeking directions or other information relating to the requester's location, system 2 creates a temporary file for requester 4 at the time of the call and populates a geo code listing field with a code corresponding to requester 4 location.

Regarding subscriber 6 locations, the geo-code field for land line numbers may either be given by subscriber 6 or generated by system 2 based on other information such as address, area code and DID information.

Regarding the location of requester 4, the geo-code field is populated when requester 4 calls in and requests information which requires the customer service representative to know the location of requester 4. In this event, such as a directions request, the customer service representative will ask requester 4 for their location and enter it in the operator terminal 20. The location will be stored as a location code in the geo-code field for that requester.

Alternatively, in either case, if an auto location system 400 is available, the geo-code field can be updated at any time, either initially, periodically, or even during the call based on the auto location information. Auto location information is updated based on the position information of either wireless subscriber 6 and wireless requester 4 generated by GPS (Global Positioning System), Triangulation, or any other method of automatically locating them and continuously transmitting this information based on a polling arrangement or other means known in the art.

The geo-code information stored in the geo-code field can be of any type or style of information capable of conveying a physical geographic location. For example, geo-code information may be stored directly in latitude-longitude format. Alternatively, a code can be assigned corresponding to a location on a map which, when combined, operate to pinpoint a physical location.

For example, in one embodiment of the present invention for determining the geo-code, a default locality can be identified with each incoming DID/NPA(Direct Inward Dialing/Area Code). This DID/NPA first identifies the metropolitan area the requester 4 is calling from or the subscriber 6 is located in. The latitude and longitude is assumed to be at a centerpoint of that metropolitan area. From that, the location can be further pinpointed either by having the customer service representative enter the information for address and cross street, which, when entered into a geo-engine determines the exact location, or in the case system 2 is operating with automatic location module 400, the exact location is refined through GPS, triangulation or any other means employed by module 400.

It should be noted that these options for geo-code data storage are intended only as examples of possible methods and are in no way intended to limit the scope of the present invention. Any method used by system 2 to store physical location information of subscriber listings in a geo code field is within the contemplation of the present invention.

It should be noted that the geo code field information may either be populated by internal system 2 info, automated information as described above, or alternatively the geo-coding and any corresponding map information may be provided to system 2 via a third party vendor.

The geo code field on listing table 52A, or temporary file 52B, is utilized by system 2 in order to allow the customer service representative to search database 18 for listings based on geographic location. For example, requester 4 could ask for the nearest 24 hour convenience store. The operator would search database 18 for listing in table 52A with a 24-hour notation in the special service field and simultaneously for the store with a location in the geo code field which is closest to the location of requester 4. The location of requester 4 can either be provided by requester 4, or it can be determined by auto-location system 400 described above.

Another example of geo-coding which can be employed by system 2 is for requester 4 to utilize multiple geographic locations including landmarks to request a desired listing. For example, if a user is near a landmark such as the Empire State Building, requester 4 can ask the customer service representative for the closest pizza restaurant from the Empire State building. Using the geo-code information, and entering both the location of the landmark, as opposed to requester 4's location, the customer service representative can retrieve that information.

It is contemplated by the current invention that operator terminal 20 has the ability to perform searches on any one field or combination of fields in listing table 52A and/or database 18. This includes but is not limited to locating WAIN listings by email address, defined locality, directory listed name, address, company, name, wireless carrier, license plate, wireline phone number and/or even a reverse search listing by WAIN In operation system 2 compares the geo code of requester 4, as generated above and either compares it to a geo-code for a known subscriber 6 listing or searches listing table 52A geo-codes field in an attempt to find subscriber 6 listings which match the request in the case of "closest to" requests. These comparisons and direction generation may be done within system 2 or alternatively the geo-code comparisons may be outsourced to third party vendors.

It should be noted that although the field description as discussed above was for WAIN Listings Database 18, WAIN Listings Database 18' preferably operates with substantially similar field structure.

Table 52A for WAIN listing databases 18 and 18' is configured not only to store subscriber information but also to provide system 2 with the ability to properly handle feature requests. For example, information stored in the special features code field in listing table 52A allows system 2 to provide features such as preferred language and targeted advertising promotion.

In addition to providing a wireless white pages service supported by database 18 other services are available through system 2. For example, a directions unit within enhanced services module 21 provides system 2 with a means to send directions to a requester 4. A directions unit is incorporated in the enhanced services module 21 used by agent application 19 running on operator terminal 20 and allows a customer service representative to retrieve directions and transmit them to requester 4. The directions feature in enhanced services module 21 may be a stand alone unit that is configured to calculate directions based on a starting and a destination address, or other criteria as currently known in the industry. In accordance with another embodiment of the invention, enhanced services module 21 may be connected via a communications channel, for example, Internet, to a remote directions calculating unit operated by a third party such as those available by MAPQUEST™.

In another example, restaurant reservations are also integrated into the enhanced services module 21 used by agent application 19 running on operator terminal 20 and provide system 2 with the ability to secure reservations and provide recommendations for restaurants to a requester 4. Reservation services are activated when the subscriber such as restaurant or other related service provider, such as a caterer, activates the reservations services at enhanced services module 21 of system 2. The reservations feature in enhanced services module 21 may be a stand alone unit that is configured to arrange reservations based on up-to-date information received from a participating restaurant, or other criteria as currently known in the industry.

In accordance with another embodiment of the invention, enhanced services module 21 may be connected via a communications channel, for example, Internet, to a remote reservations service system operated by a third party.

Recommendations are activated when a subscriber such as the restaurant or a restaurant recommendation service decides to place its information in a recommendation index found within restaurant reservation and recommendation system in enhanced services module 21.

In a third example, movie ticket and schedule software is incorporated into the enhanced services module 21 used by agent application 19 running on operator terminal 20 and provides system 2 with the ability to provide movie information and ticket purchasing. These services are activated when a subscriber such as a movie theater, playhouse or other related business, or a movie information provider provides the information to system 2.

Closing prompt module 27 provides the closing prompt identification data that will be included in a defined field such as closing prompt code field 58 of the call completion data packet 50 as shown in FIG. 4. As mentioned, call completion data packet 50 prompts switch 12 with a command to activate the appropriate closing prompt. Closing prompt module 27 functions in conjunction with agent application 19 to generate a call completion data packet 50. Call completion data packet 50 presents information to switch 12 to generate a closing prompt based on closing prompt code field 58 of the call completion data packet 50, which is recognized by switch 12. Closing prompt module 27 can either exist as a physically separate unit or it can exist as a functional module of agent application 19 software.

While one embodiment of the invention has been described above, the invention contemplates that call completion data packet 50 can be used by any combination of hardware and software such as: an ACD, a PBX, a standalone VRU(Voice Response Unit)/ASR(Advanced Speech Recognition), application software and the like, to generate the closing prompt based on the closing prompt code Agent application 19 software then creates a call completion data packet 50. Alternatively, closing prompt module 27 or some other application could create call completion data packet 50; however, for the purposes of this discussion agent application 19 will be forming call completion data packet 50. As illustrated in FIG. 4, call completion data packet 50 is comprised of multiple data fields. This can include but is not limited to the originating phone number of requester field 54, the subscriber identification number (WAIN) information field 56, closing prompt code field 58 and pre-announcement field 59. It should be noted that it is contemplated by the current invention that the WAIN information field may include both wireless and wireline listings.

In one embodiment of the present invention, agent application 19 prompts operator terminal 20 with a search screen 300, as illustrated in FIG. 6. This screen allows the customer service representative at operator terminal to enter search information, so as to retrieve the data from database 18, so as to complete the request of requester 4.

Search screen 300, is provided with a search window 302 for entering a term to be searched against the various fields in each of the listing table 52A entries in database 18. A field restriction window 304 is provided to accompany search window 302 so as to restrict the search against a particular field in listing table 52A. For example, a customer service representative can enter a word into search window 302 and then restrict the search for that term to a particular field such as name, or address in field restriction window 304.

This process can be repeated, or multiple search windows 302 and field restriction windows 304 can be provided on a single search screen 300 so as to allow searches of database 18 based on multiple criteria simultaneously so as to provide more accurate results to requester 4. There is no limit to the number of search criteria that can be used by system to search listing tables 52A of database 18 to arrive at the most accurate response to requester's 4 inquiry.

It should be noted that search screen 300 is intended only as an example of how searches can be carried out by agent application 19 and operator terminal 20, however this is in no way intended to limit the scope of the present invention. Any similar screen utilized by a similar directory assistance system to retrieve data from a database is within the contemplation of the present invention. For example, additional material that can be included on search screen 300 to assist in searching and delivery may include but is not limited to the number dialed by requester 4, the service provider of requester 4, location of requester 4 (either populated by manual entry by customer service representative or by automated-location technology) and language preference of requester 4.

In one embodiment of the present invention the location of requester 4 is automatically placed into search screen 300 via an auto location system 400, as illustrated in FIG. 1. Auto location system may be any one of a GPS (Global positioning system), triangulation, or any other system capable of pinpointing the location of requester 4. Auto location system 400 may be supported internally by system 2 or it may be outsourced to a third party.

Auto location system 400 is particularly useful when requester 4 is requesting subscriber listing based on request for "closest to." This allows system 2, through the use of the geo code field to compare locations and provide requester 4 with a subscriber 6 listing which is in close proximity to requester 4. In this situation, auto location system 400 reduces the response time by automatically providing requester 4 location to operator terminal 20 rather than having the customer service representative enter the information manually. Auto-location system 400 is particularly useful when requester 4 is lost or does not know his exact location.

In one embodiment of the present invention, agent application 19 and operator terminal 20 may provide the customer service representative with different search screens 300 based on certain criteria about requester 4 provided by incoming caller information record 15.

For example, in one embodiment of the present invention, as illustrated in FIG. 7, search screen 500A is provided where requester 4 is calling from an exemplary first service provider, as identified from service provider field of incoming caller identification record 15. Alternatively, as illustrated in FIG. 8, search screen 500B is provided were requester 4 uses an exemplary second service provider. This allows system 2 to recognize the service provider of requester 4 so that special features may be included in the search screen which are unique to certain service providers. For example, search screen 500A for the first service provider may allow enhanced searching of database 18 for other customers of the first service provider. As such, search screen 500A is provided with a special feature search 510A window for that purpose. Alternatively, the second service provide may not provide such a feature and, as such, there is no corresponding search window in search screen 500B

In addition to providing additional search features, each of the various service providers that employ system 2 may require the customer service representative to make different opening statements. For example, in statement window 515A in search screen 500A, when a first service provider call is answered, the customer service representative is prompted to say, "Welcome to XYZ directory assistance."

Alternatively, if the call originates from a second service provider caller then statement window 515B on search screen 500B will prompt the statement, "Welcome to ABC caller services." It should be noted that statement window 515A and 515B are intended only as examples of differentiation of search screens between different service providers and is no way intended to limit the scope of the present invention. For example, instead of providing speaking instructions the introductions may be included in the search screen 500A and 500B as wave files to be read to requester 4 automatically by VRU switch 12.

By employing specialized search screens 500A and 500B the operator is able to immediately answer the call properly without having to look up which statement to read or wait for the retrieval of the proper search screen. Additionally, when the statement is changed by a service provider, the statement can be changed in system 2 automatically and distributed immediately to all operator terminals 20.

Yet another advantage of specialized search screens such as 500A and 500B is that the content of each search screen can be different based on the specifications provided by the service provider. For example, a search screen may direct requesters 4 to special services, which can be linked to directly from the operator terminal screen. If a first service provider is offering movie tickets and times a special feature window 525A would appear on search screen 500A allowing the customer service representative to link directly to those services with out redirecting the call to other operators. Another search screen for a different service provider may provide a link to one of many available restaurant listings as specified by that service provider. This feature greatly increases the amount of service that can be made available through system 2 while simultaneously offering those service at little or no additional overhead, and also with little or no additional time for retrieving and delivering the requested data.

It should be noted that the above described specialized search screens are intended only as examples and are in no way intended to limit the scope of the present invention. For example, in the event different service providers may offer different services as well as requiring the customer service representative to read different introduction, possibly related to their particular services. Specialized search screens which incorporate combinations of the features described herein are within the contemplation of the present invention.

In one embodiment of the present invention, as illustrated in FIG. 9, search screen 500C is provided, which is a Spanish language screen. When requester 4 calls system 2, incoming caller identification record 15 maintains a preferred language field which alerts agent application and operator terminal to not only forward the request to a customer service representative who speaks Spanish but also a Spanish language search screen 500C. System 2 can base the decision of using Spanish language search screen 500C based on either information included in incoming caller identification record 15 or on caller DID as discussed above.

In one embodiment of the present invention, as illustrated in FIG. 10, search screen 500D can be designed to include special features or even include pre-entered information into search windows based on the DID field from the incoming caller identification record 15. For example, search screen 500D may include an area special search feature window 520 which is only included for searches which originated from a particular area code. This feature may be utilized to favor certain subscriber listings who advertise by area of the country so that, for example, if requester 4 calls from an area code in Arizona and there is a particular subscriber 6 who is in the area and has paid system 2 to be favored, when requester 4 requests the nearest convenience store listing the particular paid advertiser subscriber 6 will be selected over other geographically equidistant subscriber 6 listings. Search screen 500D may also populate area special search feature window 520 with information obtained from auto-location system 400 rather than from the DID field of incoming caller identification record 15.

In this configuration, special feature search window 520 may be populated automatically with the location of the caller under the assumption that the requested listing will most likely be in proximity to requester's 4 location. This information is preferably automatically entered by auto-location system 400. However, if auto-location 400 is unavailable, requester's 4 presumed location may be populated based on the requester's 4 DID field. For example, when the requester 4 phone number includes an area code, search window 520 appears with the locality corresponding to that area code. The requester's 4 personal location may also be populated based on the number dialed to contact directory assistance system 2 using a presumed location. The customer service representative then has the chance to confirm the locality presumed by system 2 after receiving the desired locality of requester 4.

This arrangement reduces the amount of time it takes for the customer service representative to enter the appropriate caller location, necessary for features which require that information. In the event that the location of requester 4 is incorrect, the operator has the option of manually changing the information.

In one embodiment of the present invention, as illustrated in FIG. 11, search screen 500E can be designed to include special features related to directions requests based on the DID field from the incoming caller identification record 15. For example, search screen 500E may include a destination window 522 which is included when a call comes in over a particular DID reserved for directions requests. Additional directions related widows may be included on search screen 500E to further facilitate the direction retrieval process as discussed above. If in the case the caller auto location system 400 is active the starting information window on search screen 500E will already be populated.

It is noted that this arrangement greatly reduces the amount of time necessary for the operator to enter the starting location information of requester 4 when they are attempting to obtain directions. This is particularly advantageous when requester 4 is seeking directions for a long or complicated route. In such a case, a requester's 4 may actually contact operator terminal 20 several times en route to their desired destination, requiring the recalculation of directions several times, each time from their current starting location. The ability to automatically populate the starting location of requester 4 via auto-location system 400 reduces the amount of operator time necessary to obtain the directions.

It should be noted that the above examples of special search screens 500A-500E are intended only as examples and are in no way intended to limit the scope of the present invention. Any number of criteria collected by system 2 regarding requester 4, used by agent application 19 and operator terminal 20 to generate a specialized search screen to be distributed to the customer service representative or to pre-populate particular fields in the standard search window, is within the contemplation of the present invention.

Call completion data packet 50 is formed by agent application 19 at operator terminal 20 using information from incoming call information record 15, listing table 52A from database 18, and closing prompt module 27. This information is then organized and used to populate the fields of call completion data packet 50.

The originating phone number field 54 is the originating phone number of requester 4. The subscriber identification number (WAIN) information field 56 is the requested listing of the subscriber. This information is provided to operator terminal 20 by the retrieved listing from listing table 52A and/or database 18. The WAIN information field identifies the proper destination for the completed call. This information is used to properly connect requester 4 to subscriber 6. Closing prompt code field 58 of call completion data packet 50 contains instructions on which closing prompt to retrieve, use and play for requester 4. Pre-announcement field 59 of call completion data packet 50 denotes to the Voice Response Unit (VRU) whether or not a pre-announcement feature is activated. If the pre-announcement feature is activated the VRU will announce requester 4's identity to subscriber 6 by either voice or text message so that subscriber 6 can determine whether or not to accept the call.

When combined, the originating phone number of requester field 54, the WAIN information field 56, the closing prompt code field 58, and the pre-announcement field 59 contain all of the information needed to initiate and complete the call, play the appropriate closing and pre-announcement.

Wide Area Network (WAN) 25 is configured to couple all operator terminals 20 to system 2 and 2'. This includes connections between geographic locations, such that operator terminals 20 located at a call center can connect with switches 12 at other remote locations. As noted earlier and to be discussed in more detail below, because primary call center 16 may route calls to remote operator terminals 20' it is necessary that those operator terminals 20' be able to communicate back to the originating switch 12 in order to connect to the proper call. WAN 25 is configured to relay call completion data packet 50 to the appropriate switch 12 in order to complete requester 4's call.

Agent application 19, as supported by one of the operator terminals 20, communicates via operator terminals 20 to any one of the switches 12 with the combination of systems 2, 2' etc. via Wide Area Network 25 (WAN). WAN allows customer service representatives at operator terminals 20 to transmit a call completion data packet 50 from operator terminals 20 to any one of switches 12. In the event that agent application 19 is unable to successfully pass call completion data packet 50 due to any number of reasons including but not limited to the unavailability of WAN 25 or the rejection of call completion data packet 50, Agent application 19 can initiate call completion using in-band signaling such a DTMF. This allows agent application 19 to put the caller on soft hold and pass the destination digits to switch 12 via the same trunk. Switch 12 then accepts the digits and releases the call to call center 16 and initiates call completion as described hereinafter.

As discussed above out-of-band processor 200 delivers instructions for transmitting the desired information to requester 4 as indicated by operator terminal 20. These options include, speaking the requested listing via VRU/switch 12, sending the requested listing via SMS, WAP, HTTP or other text protocol, direct connection to subscriber 6 or any other feasible deliver method supported by requester's 4 device and service provider. By signaling the closing operation method from operator terminal 20 to switch 12 via out-of-band processor 200 the signal processing speed is greatly increased overcoming the current system slowing drawbacks associated with in-band signaling currently used in directory assistance systems.

As part of the call completion process, switch 12 has the ability to select the optimal trunk group to be used for the completion of requester 4 to subscriber 6. For example, if switch 12 has a direct connection to the service provider 26 of subscriber 6, the completion of this call would be implemented over this link.

In the case where switch 12 did not have a direct connection to the service provider 26 of subscriber 6, the completion of this call would be via the PSTN 10. This allows switch 12 to select the most cost effective means of delivering the call to subscriber 6. This selection of the outbound trunk group may be determined by call completion table 17 (as shown in FIG. 1) based on information contained in call completion data packet 50. For example, the NPA.NXX of the number in the WAIN information field 56 in call completion data packet 50 can be used to indicate service provider 26 for that listing. This information is then used to determine whether a direct connection exists from switch 12 to that service provider 26. If such a direct connection exists, then the first choice route for this call would be via that link. In the event that such direct connection is not available or does not exist, an alternate route such as a connection to the PSTN 10 could be used.

As discussed above, when completing the call to the requester, operator terminal 20 may utilize in-band or out-of-band processing. In operation as the call is to be completed a section of the search screen, such as specialized search screens 500A-500E, will indicate all of the possible call completion possibilities. This allows the user, or if no preference is given, the customer service representative, to easily select from all of the available cal completion options for the requester. These options include but are not limited to, connection with the requested listing, delivery of the listing by voice via switch/VRU12, SMS, e-mail, HTTP, WAP, fax, or any other means supported by the device used by requester 4. In the event requester 4 has a subscriber listing stored in table 52A, system 2 may utilize the information contained in the device capability field, to provide search screens 500 on operator terminal 20 with the feasible connection alternatives.

Requester Call Operations

Figure 5:
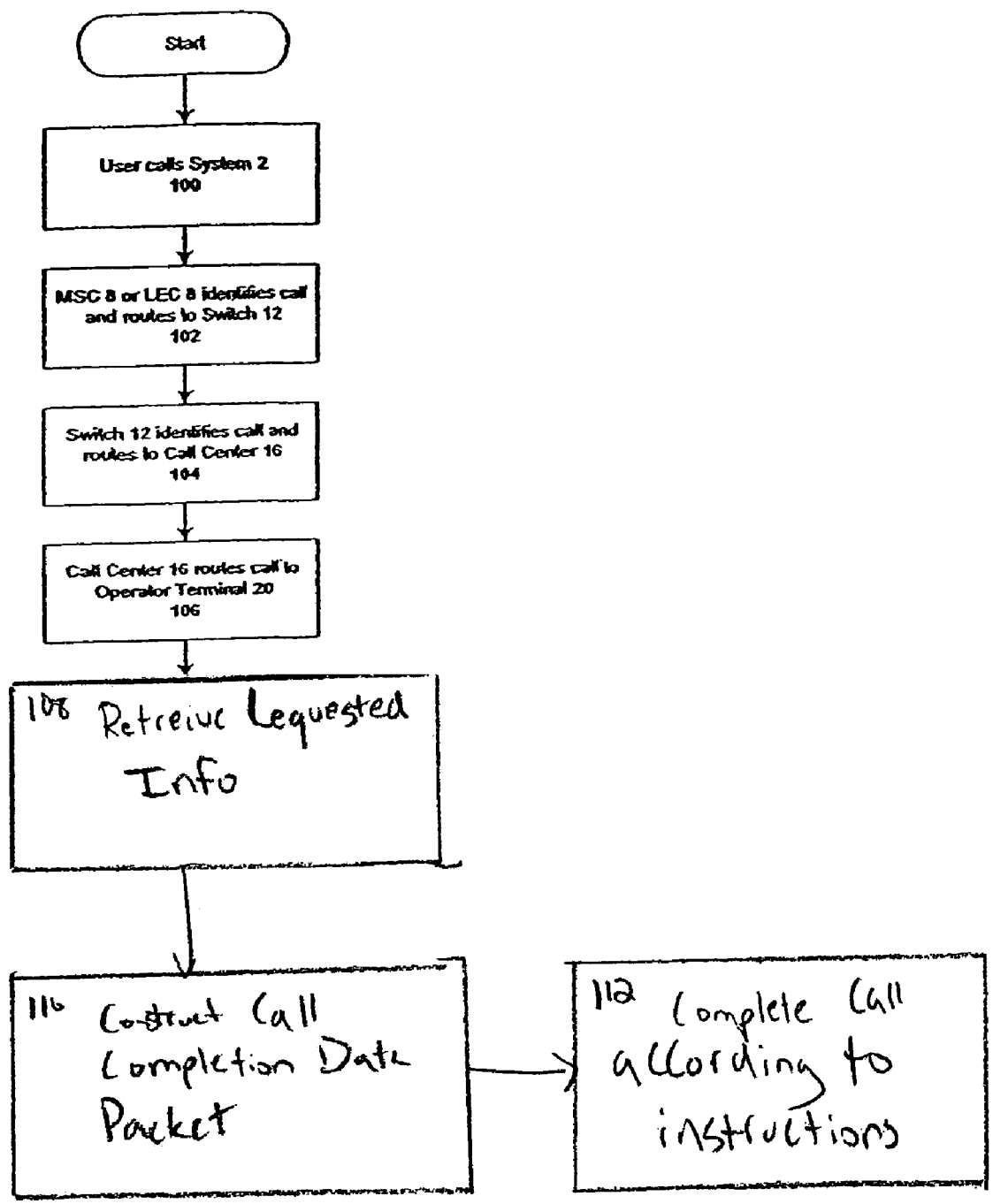
FIG. 5 is a flow chart demonstrating the operation of the system in accordance with one embodiment of the present invention.

As illustrated in the flow diagram of FIG. 5, initially, at step 100, requester 4 calls system 2. The method for accessing system 2 can be via any known dialing pattern such as an "800" number, an NPA.NXX number or NPA-555-xxxx, but also can be a shortened information-like number, such as "411," "555," "#555," etc. Preferably, access to system 2 is arranged such that the access number dialed by requester 4 is available nationwide such that requester 4 need not be concerned with individual access numbers depending on their location, or whether they are accessing system 2 via a wireless device or a wireline device.

At step 102, Mobile Switching Center (MSC) 8 recognizes the pattern dialed by requester 4 as belonging to system 2 (i.e., a request for communication assistance) and routes the call to switch 12 along with the originating phone number of requester 4. Switch 12 tracks call detail information upon receiving the call from MSC 8.

An additional feature of switch 12 is its ability to recognize and translate dial number strings allowing system 2 to provide agent application services to multiple customers. Upon dialing the appropriate number, MSC 8, is configured to recognize that the dialed number string belongs to the communication assistance system and method, and routes the inbound call to switch 12. If necessary, prior to routing the call to switch 12, MSC 8 may translate the user's dial string (for example #555) to a digit sequence recognized by system 2.

This translation allows different service carriers to access the service provided by the present invention using either a universal access number or different user dial strings. For example, in the event that two carriers decide to use different dial strings (i.e. cellular telephone carrier A may support access to system 2 by dial string *5 while cellular carrier B may access the service using the dial string 411), each carrier's Mobile Switching Center (MSC) 8 may or may not select to translate this dial string before routing the call to switch 12. Upon receiving the inbound call, switch 12 may further translate the MSC 8 dial string and route the call to primary call center 16. The number sent by switch 12 allows system 2 to identify the particular MSC 8 from which the dial string was received along with the actual MSC dial string so that elements of system 2 can determine what service is desired, and where the inbound call originated. It is also contemplated by this invention that calls may originate from a wireline carrier and/or VoIP carrier as shown in FIG. 1.

An additional feature available using this technology is to provide a separate dial string as an indicator of preferred language information to system 2. For example, if a dial string such as NPA.555.1818 is used, switch 12, after translating the MSC dial string, will automatically send a Spanish language preference indicator in incoming call information record 15 so that the primary call center 16 will route the call to an appropriate operator terminal 20, such as a Spanish speaking operator. Advantageously, Spanish speaking operators may be located remotely from system 2 and calls to be handled by them may be routed via call center 16 to a remote call center 16' as described above in reference with FIG. 1.

It should be noted that the above example of call signaling methodology is intended only as an example of call routing and requester 4 identification and is not intended to limit the scope of the present invention. Any such signaling methodology protocol, which is capable of transmitting the call between the MSC 8 and switch 12 is within the contemplation of the present invention.

At step 104, switch 12 routes the call to primary call center 16. To perform this task, switch 12 creates incoming call information record 15, as shown in FIG. 2, with the pertinent information as described in more detail above, and selects a direct trunk to call center 16. The configuration being used to carry the call between switch 12 and primary call center 16 preferably is a release link trunk configuration, discussed above in detail. While not discussed here, it is contemplated that any trunking and/or signaling configuration can be used to route the call from switch 12 to call center 16. It is also contemplated by this invention that switch 12 may connect this call to call center 16 via Public Switched Telephone Network PSTN 10 (i.e. using an 800 number or a directly dialed number).

Next, at step 106, upon receiving the call from requester 4, primary call center 16 notifies an available operator terminal 20 with the appropriate skills, if necessary, that an inbound request has arrived and routes the call there. Upon establishing a link between requester 4 and operator terminal 20, primary call center 16 establishes a voice and communications link from the caller to the customer service representative. The two-way voice communication is routed directly from requester 4 through primary call center 16 to operator terminal 20, having an attached telephonic communication means.

The data communication, which may include any information contained in incoming call information record 15 (i.e. the number dialed by requester 4 (the DID), the preferred language code, the originating phone number of the requester and the requester service provider field) is transmitted to the primary call center 16 to operator terminal 20 via Computer Telephony Interface (CTI) 29. CTI 29, deployed between primary call center 16 and operator terminals 20, is used to communicate the information necessary for the customer service representative and agent application 19 software to handle and complete the call. As discussed above, based on incoming caller information record 15, system 2 selects the appropriate search screen 300 or specialized search screen 500A-500D to present to the customer service representative at operator terminal 20.

Using this link, an agent asks requester 4 for information regarding the services they are requesting. Requester 4 supplies the necessary information. An example of this information may include but is not limited to: the directory listed name, the defined locality, the email address, the name, wireline phone number, license plate, location etc. or any combination of this information for creating a multiple field search criteria. Thus for example, the caller may ask for the Chinese restaurant on Main street, without remembering the name of it.

In another example, a requester 4 asks the agent for a type of location closest to a given landmark. For example, is requester 4 is located near to a landmark, which maintains a listing in database 18, then using multiple search criteria, the agent can enter the location of the requester, the landmark location and then simultaneously search for the nearest requested listing type such as a restaurant, hardware store, etc.

It is contemplated by the current invention that traditional directory assistance and enhanced directory assistance may also be provided by this system. As discussed above, operator terminal may conduct this search based on one or more criteria simultaneously so as to provide a more accurate result for requester 4. Additionally, if auto-location system 400 is in operation, the location of requester 4 is automatically transmitted to operator terminal 20 at this time.

It should be noted that based on the search screen selected various elements of information may already be included on search screens 500A-500E. For example, in the event requester 4 is asking for directions and auto-location system 400 is in operation, when directions search screen 500E is prompted the window for the starting location of requester 4 will already be populated. Similarly, when the requester 4 has asked for special services such as ticket, movie, restaurant, or reservations services, system 2 recognizing the DID used by requester 4 to contact system 2 via incoming caller identification record 15, will select an appropriate search screen 500 and pre-populate various windows on those search screens 500 so as to further reduce the time required by the customer service representative to retrieve the requested listings.

At step 108, the agent at operator terminal 20 then initiates a search of database 18. Of course, if primary call center 16 is busy or there are no available operator terminals 20, the requester 4's call can be forwarded to call center 16' which can accommodate the requester's inquiry in the same manner as described above in step 106. If the requested listing is unavailable, the agent awaits further instruction from requester 4. It should be noted that the customer service representative at operator terminal 20 allows the representative to search database 18 through several different fields on listing table 52A simultaneously, including the ability to search for listings based on geographic location using the geo code field.

Next at step 110, agent application 19 software on operator terminal 20 constructs call completion data packet 50. Call completion data packet 50 is prepared using information from incoming call information record 15, Listing table 52A, database 18, closing prompt module 27, agent application 19 and verbal information from requester 4.

Upon completion of call completion data packet 50, operator terminal 20 transmits call completion data packet 50 to switch 12 via Wide Area Network 25. WAN 25 is connected to all switches 12 and all operator terminals 20 in system 2, such that should an operator terminal 20 be remotely located from switch 12 as a result of call routing, operator terminal 20 will be able to send the call completion data packet 50 through WAN 25, even to remotely located switches 12. The appropriate switch 12 is identified by agent application 19, using the DID which identifies the originating switch where the requester's 4 call entered system 2.

Alternatively, as discussed above, switch 12 can be instructed by operator terminal 20 and agent application 19 via out-of-band processor 200 on how to end the call with requester 4. Switch 12 receives the out-of-band signal and terminates the call by either relaying the request by voice, SMS, HTTP, WAP or by directly connecting requester 4 directly to subscriber 6. As discussed above, and as illustrated in FIGS. 6-11, the various call completion options are contained in a highlighted or tabbed portion of search screens 500, making the call completion selection process as convenient as possible.

Next, at step 112, switch 12 completes the call in the manner selected by operator terminal 20 in the previous step Additionally, upon completion of the call, switch 12 uses the information in closing prompt code field 59 of call completion data packet 50 to play the appropriate closing prompt to requester 4 just before they are connected to subscriber 6.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A communication assistance system comprising:
   a first database having a plurality of listings therein, each of said listings having at least one contact name and a corresponding contact number;
   a means for receiving communications from a user among a plurality of users desiring to access said listings; and
   an operator terminal for displaying a search screen among a plurality of search screens each of which maintain at least a partially different arrangement of content and search windows for receiving search terms to search for listings contained in said first database, wherein said displayed search screen is determined based on criteria contained in a search request from said user, said operator terminal further configured to receive said communication from said user and retrieve a listing from said first database using said displayed search screen.

2. The communication assistance system according to claim 1, wherein said displayed search screen maintains a field restriction window configured to restrict the search to a field in said first database.

3. The communication assistance system according to claim 1, wherein said displayed search screen is selected among said plurality of search screens based on a number dialed by said user to reach said communication assistance system.

4. The communication assistance system according to claim 1, wherein said displayed search screen is displayed in the language preferred by said user.

5. The communication assistance system according to claim 1, wherein said displayed search screen is selected among said plurality of search screens based on the service provider of said user.

6. The communication assistance system according to claim 5, wherein said displayed search screen for said service provider maintains an introduction message to be read to said user by the operator at said operator terminal.

7. The communication assistance system according to claim 6, wherein said introduction message is changed, such that said change is automatically updated to all of said operator terminals in said communication assistance system.

8. The communication assistance system according to claim 1, wherein said displayed search screen maintains an indication of the geographic location of said user.

9. The communication assistance system according to claim 8, wherein said geographic location of said user is provided by said user.

10. The communication assistance system according to claim 8, wherein said geographic location of said user is provided by an auto location system.

11. The communication assistance system according to claim 8, wherein said displayed search screen at said operator terminal is configured to search for listings based on a proximity operation, wherein the listings retrieved from said first database are retrieved based on the listings closets to the geographic location of the user.

12. A communication assistance system comprising:
a first database having a plurality of listings therein, each of said listings having at least one contact name and a corresponding contact number;
means for receiving communications from a user among a plurality of users desiring to access said listings; and
an operator terminal displaying a first search screen from among a plurality of search screens each of which maintain at least a partially different arrangement of content and search windows, wherein said search screen is selected from among said plurality of search screen based on a predefined criteria, said operator terminal configured to receive said communication from said switching device and retrieve a listing from said first database using said selected search screen.

13. The communication assistance system as claimed in claim 12, wherein said predefined criteria for selecting said first search screen from said plurality of search screens, is the service provider of said user.

14. The communication assistance system as claimed in claim 13, wherein said predefined criteria for selecting said first search screen from said plurality of search screens, is based on different searching options, corresponding to directory options offered by said service provider of said user.

15. The communication assistance system according to claim 14, wherein said first search screen for said service provider maintains an introduction message to be read to said user by the operator at said operator terminal.

16. The communication assistance system as claimed in claim 15, wherein said introduction message is stored as recorded audio file to be played when said user contacts said communication assistance system.

17. The communication assistance system as claimed in claim 13, wherein said first search screen, for said service provider provides a special features options, corresponding to special features offered by said service provider.

18. The communication assistance system as claimed in claim 17, wherein said special features options include any one of, movie ticket sales, and restaurant listings.

19. The communication assistance system as claimed in claim 12, wherein said first search screen is displayed in the language preferred by said user.

20. The communication assistance system according to claim 12, wherein said first search screen maintains an indication of the geographic location of said user.

21. The communication assistance system according to claim 20, wherein said geographic location of said user is provided by said user.

22. The communication assistance system according to claim 20, wherein said geographic location of said user is provided by an auto location system.

23. The communication assistance system according to claim 20, wherein said first search screen at said operator terminal is configured to search for listings based on a proximity operation, wherein the listings retrieved from said first database are retrieved based on the listings closets to the geographic location of the user.

24. The communication assistance system according to claim 22, wherein said first search screen at said operator terminal is configured to provide a directions search for said user, wherein said starting position is automatically entered by said auto-location system.

25. The communication assistance system according to claim 24, wherein said directions search is recalculated along said route each time said user contacts said communications assistance system.

26. The communication assistance system according to claim 1, wherein said communication from said user requesting a performed electronically, in a format selected from the group consisting of Short Messaging Service (SMS), Wireless Application Protocol (WAP), Live Chat, and Instant Messaging.

27. The communication assistance system according to claim 12, wherein said communication from said user requesting a performed electronically, in a format selected from the group consisting of Short Messaging Service (SMS), Wireless Application Protocol (WAP), Live Chat, and Instant Messaging.

* * * * *